United States Patent
Joseph et al.

(10) Patent No.: US 11,105,344 B2
(45) Date of Patent: Aug. 31, 2021

(54) AEROFOIL

(71) Applicant: ROLLS-ROYCE plc, London (GB)

(72) Inventors: Philip Joseph, Southampton (GB); Chaitanya Paruchuri, Southampton (GB)

(73) Assignee: ROLLS-ROYCE plc, London (GB)

( * ) Notice: Subject to any disclaimer, the term of this patent is extended or adjusted under 35 U.S.C. 154(b) by 151 days.

(21) Appl. No.: 16/117,499

(22) Filed: Aug. 30, 2018

(65) Prior Publication Data

US 2019/0376529 A1 Dec. 12, 2019

(30) Foreign Application Priority Data

Jun. 7, 2018 (GB) .................... 1809353.4

(51) Int. Cl.
*F04D 29/66* (2006.01)
*F01D 9/04* (2006.01)

(52) U.S. Cl.
CPC ........... *F04D 29/667* (2013.01); *F01D 9/041* (2013.01); *F05D 2220/323* (2013.01); *F05D 2240/121* (2013.01); *F05D 2260/962* (2013.01)

(58) Field of Classification Search
CPC ...... F04D 29/66; F04D 29/661; F04D 29/663; F04D 29/667; F01D 5/141; F01D 5/146; F01D 5/16; F01D 9/00; F01D 9/041; F05D 2240/121; F05D 2240/303; F05D 2250/11; F05D 2250/184; F05D 2260/96; F05D 2260/962
USPC .................................................. 416/228, 237
See application file for complete search history.

(56) References Cited

U.S. PATENT DOCUMENTS

| | | | |
|---|---|---|---|
| 6,431,498 B1 | 8/2002 | Watts et al. | |
| 2011/0058955 A1 | 3/2011 | Jung et al. | |
| 2013/0164488 A1 | 6/2013 | Wood et al. | |
| 2014/0377077 A1* | 12/2014 | Gruber | F01D 5/141 |
| | | | 416/228 |
| 2017/0022820 A1* | 1/2017 | Joseph | F01D 5/141 |
| 2017/0241278 A1* | 8/2017 | Paruchuri | F04D 29/324 |
| 2018/0283180 A1* | 10/2018 | Jain | F01D 25/02 |
| 2019/0170003 A1* | 6/2019 | Figeureu | F04D 29/667 |

* cited by examiner

*Primary Examiner* — Christopher Verdier
*Assistant Examiner* — Elton K Wong
(74) *Attorney, Agent, or Firm* — Oliff PLC

(57) ABSTRACT

An aerofoil component (10) defining an in use leading edge (16) and a trailing edge (18), the leading edge (16) comprising at least one serration (22) defining a sawtooth profile projecting in a generally upstream direction, each serration (22) comprising a plurality of rectangular-wave projections (26) extending in an upstream chordwise direction from the sawtooth profile.

14 Claims, 3 Drawing Sheets

AEROFOIL

CROSS-REFERENCE TO RELATED APPLICATIONS

This application is based upon and claims the benefit of priority from British Patent Application No. GB 1809353.4, filed on 7 Jun. 2018, the entire contents of which are herein incorporated by reference.

BACKGROUND

Technical Field

The present disclosure concerns an aerofoil, particularly but not exclusively, an aerofoil for a gas turbine engine having a reduced broadband noise profile in use.

Description of the Related Art

Noise from aircraft is an ongoing environmental concern. There are typically several sources of noise from an aircraft, including jet noise produced by shear interaction between the jet exhaust from gas turbine engines, and aerodynamic noise caused primarily by turbulent air created by the flow of air over aircraft surfaces. One particular source of noise is due to interaction between a wake resulting from an upstream component such as a fan or propeller rotor impinging on the leading edge of a downstream component such as an Outlet Guide Vane (OGV).

As aircraft engine bypass ratios are increased, aircraft aerodynamic noise is becoming a relatively large contributor to overall aircraft noise. In particular, turbulence created on the leading and trailing edges of aerofoil surfaces is thought to produce a significant proportion of noise produced by an aircraft. Noise created by these mechanisms often has a wide range of frequencies (known as "broadband noise"), and is particularly difficult to eliminate.

Examples of aerofoils on aircraft include the wings and tail surfaces, as well as smaller components such as control surfaces and high lift devices such as flaps and slats. The gas turbine engines of the aircraft also typically include several aerofoils, including compressor and turbine rotors and stators, fan rotors and Outlet Guide Vanes (OGV). The gas turbine engine nacelle is also typically aerofoil shaped.

It has been proposed to provide wave-like projections on the leading edge of an aerofoil, as proposed for example in U.S. Pat. No. 6,431,498. It is thought that such projections reduce drag as well as reduce noise to some extent, as evidenced for example in US2013164488. Such projections have been proposed for both fixed and rotating aerofoils, as proposed for example in US2011058955. However, such projections do not eliminate noise completely, and it is therefore desirable to provide an aerofoil having improved noise attenuation properties.

The term "chord" will be understood to refer to the distance between the leading and trailing edge of an aerofoil, measured parallel to the normal in use airflow over the wing. The term "chordal" will be understood to refer to a direction parallel to the chord. The term "span" will be understood to refer to a direction generally normal to the chord, extending between a root and a tip of an aerofoil component.

BRIEF SUMMARY

According to a first aspect of the disclosure there is provided an aerofoil having a leading edge and a trailing edge, the leading edge comprising a plurality of slits extending toward the trailing edge, each slit defining a slit height from a peak at the leading edge to a trough spaced from the leading edge, the plurality of troughs defining a repeating waveform pattern, such that the troughs define a plurality of mutually coherent noise sources to cause destructive interference of noise created by the troughs.

Advantageously, it has been found that the disclosed aerofoil leading edge profile provides reduce broadband noise for a given slit height when in use compared to prior arrangements, thereby allowing for either reduced noise, or reduced drag for a given slit height.

The repeating waveform pattern may comprise one of a sawtooth waveform, a triangular waveform, and a sinusoidal waveform.

The plurality of peaks may extend in a generally straight line in a spanwise direction.

Each peak may comprise a generally spanwise extending upstream end surface. Advantageously, it has been found that the aerodynamic performance of the aerofoil is improved by having a relatively straight leading edge for at least a portion of the span. Furthermore, by providing a flat leading edge at the peaks, a relatively strong noise source is provided at these locations. This provides effective interference between noise produced at the peak and noise produced at the troughs.

Each slit may comprise a generally chordwise extending side surface provided at each end of each peak, interconnecting each peak with an adjacent trough. Each side surface may extend orthogonally to each end surface.

Each trough may comprise a spanwise extending interconnecting portion extending across the trough interconnecting adjacent side surfaces and defining a spanwise extent (a). The spanwise extending interconnecting portion may extend at an angle of approximately 30° relative to the chordal direction.

The spanwise extending upstream end surface may have a spanwise extent (b) between 2 and 5 times greater than the spanwise extent (a) of the interconnecting portion.

The leading edge profile may comprise a nadir provided at a downstream end of the leading edge.

The leading edge profile may define a waveform chordal extent (h) between the downstream nadir and the upstream end surface. A ratio of the chordal extent (h) to the spanwise separation (a) may be between 30 and 100. A ratio between the chordal extent (h) and the spanwise extent (b) may be between 10 and 25.

A waveform wavelength ($\lambda$) may be defined by a spanwise separation between adjacent nadirs. A ratio of the wavelength ($\lambda$) to the spanwise separation (a) may be between 10 and 60, and a ratio of the wavelength ($\lambda$) to the spanwise extent (b) may be between 10 and 60. It has been found that the disclosed arrangement provides particularly effective noise reduction where the waveform wavelength to spanwise separation ratio is within this range.

The aerofoil may define a mean chord line ($C_0$) defined by a line extending from a root to the tip of the aerofoil along an arithmetic mean of the chordal positions of the midpoints of chords between the leading edge and the trailing edge of the aerofoil. A mean chord extent may be defined by a distance between the trailing edge and the mean chord line ($C_0$). A ratio between the aerofoil mean chordal extent and the waveform chordal extent (h) may be between 20:1 and 10:1. It has been found that these parameters result in particularly low noise generation in use.

The aerofoil component may comprise an aerofoil of a gas turbine engine, such as an outlet guide vane (OGV).

According to a second aspect of the present disclosure there is provided a gas turbine engine comprising an aerofoil component in accordance with the first aspect of the present disclosure.

According to a third aspect of the present disclosure there is provided an aircraft comprising an aerofoil component in accordance with the first aspect of the present disclosure.

The skilled person will appreciate that except where mutually exclusive, a feature described in relation to any one of the above aspects of the invention may be applied mutatis mutandis to any other aspect of the invention.

DESCRIPTION OF THE DRAWINGS

Embodiments of the invention will now be described by way of example only, with reference to the Figures (which are not to scale), in which.

DETAILED DESCRIPTION

Figure 1:
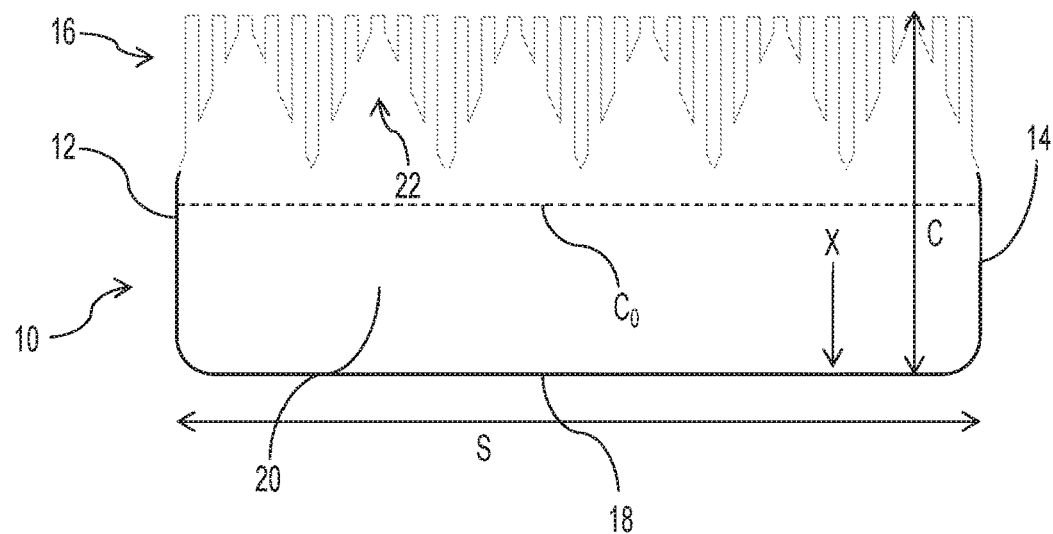
FIG. 1 is a schematic plan view of a first aerofoil in accordance with the present disclosure.

FIG. 1 shows a first aerofoil 10 in accordance with the present disclosure. The aerofoil 10 defines a root 12, a tip 14, a leading edge 16, a trailing edge 18, a suction surface 20 and a pressure surface (not shown) on the opposite side to the suction surface 20. The aerofoil 10 defines a mean chord line $C_0$ defined by a line extending from the root 12 to the tip 14 of the aerofoil 10 along the arithmetic mean of the chordal positions of the midpoints of chords between the leading edge 16 and the trailing edge 18 of the aerofoil 10. The aerofoil 10 defines an in use flow direction X extending in a direction from the leading edge 16 to the trailing edge 18. A distance between the leading and trailing edges 16, 18 defines a chord C, while a distance between the root and tip 12, 14 defines a span S.

The leading edge 16 of the aerofoil 10 defines a profile when viewed from either the suction surface 20 or pressure surface of the aerofoil 10. This profile is shown in further detail in FIG. 2, which shows the leading edge 16 of the aerofoil 10.

The leading edge 16 profile includes a plurality of slits 22, which extend in a generally spanwise direction toward the trailing edge 18. Each slit 22 comprises a cut-out in the leading edge 16 of the aerofoil 10, which extends through the aerofoil from the suction surface 20 to the pressure surface. Each slit 22 extends from an upstream end defined by an peak 28 to a downstream end defined by a trough 26. Adjacent peaks 28 are provided at the same chordal extent, such that the peaks form a straight line extending in a spanwise direction. On the other hand, at least a portion of the adjacent troughs 26 are spaced in a chordal direction, such that the troughs 26 define a repeating waveform profile.

Each peak 28 comprises a generally spanwise extending forward end surface 29, which defines a spanwise extent b. Ends of each peak 28 are connected to generally chordally extending side surfaces 30, which in this embodiment extend orthogonally to the forward end surfaces 29, toward the trailing edge 18. Each side surface 30 is in turn connected to a generally spanwise extending interconnecting portion surface 32, which interconnects adjacent side surfaces 30.

Each trough 26 comprises the interconnecting portion surface 32. The interconnecting portion surface defines a waveform profile, as will be described in greater detail below. Each trough extends in an at least part spanwise direction to an extent a, which defines a width of each slit 22, and so a separation between each peak 28. Each trough 26 includes a corner 34 having an acute angle (i.e. an angle less than 90°). In some cases, the corner 34 is defined by the intersection between the side surfaces 30 and the trough 26, and in other cases, the corner 34 is defined by an acute angle formed by the trough 26 itself. Each corner 34 defines a strong source of noise when an airflow passes over the aerofoil in the direction X. In general, noise reduction is improved by increasing the number of corners 32. In experiments, aerofoils having fifty corners have been trialed. Further increases in the number of corners 32 tends not to further improve the noise reduction.

In general, a ratio between the distances b:a is between 2 and 5, and in this embodiment is 3.

Figure 2:
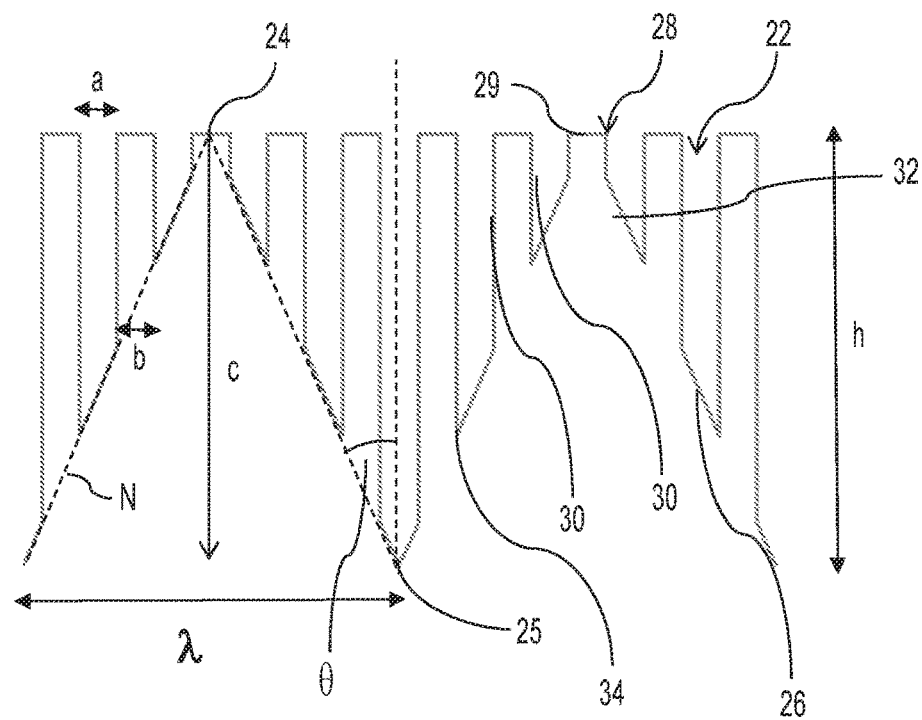
FIG. 2 is a schematic plan view of a leading edge of the aerofoil of FIG. 1.

In the embodiment shown in FIGS. 1 and 2, the waveform profile is defined by notional straight lines N (shown as a dotted in line in FIG. 2) each extending between an apex 24 defined by one of the peaks 28 provided at an upstream end of the leading edge surface and a nadir 25 provided at a downstream end of the leading edge surface 16. In some embodiments, the nadir 25 defined by the notional line 25 may not coincide with the real leading edge, but may only be notional. Each notional line N extends diagonally relative to the span S and chord C, and defines an angle θ of approximately 30° relative to the chordal direction C. Consequently, the notional lines N define a triangular wave profile extending in a spanwise direction along the leading edge 16. Where the notional line N intersects with the slits 22, the notional line N defines the leading edge at this spanwise location, and so defines the troughs 26.

A waveform height h is defined by a chordal distance between the apex 24 and nadir 25. Typically, the waveform height is approximately 7 to 10% of the mean chord length $C_0$. Similarly, a waveform wavelength λ is defined as the spanwise distance between nadirs 25 or apexes 24. A ratio of the wavelength λ to the spanwise separation a may be between 10 and 60, and a ratio of the wavelength λ to the spanwise extent b may be between 10 and 60.

Another way of defining the profile of the leading edge 16, is to consider the leading edge 16 to comprise a series of rectangular wave projections, which extend from the notional lines N defining the triangular waveform at regular, spaced interval. In other words, the leading edge profile is defined by overlaying a square wave and a triangular wave, wherein apexes of the rectangular waveform and the triangular waveform are provided at approximately the same chordal position. The leading edge surface may then be defined by the more upstream (i.e. furthest from the trailing edge 18) of the rectangular wave and the triangular wave profile at any given point along the span of the leading edge 16.

Figure 3:
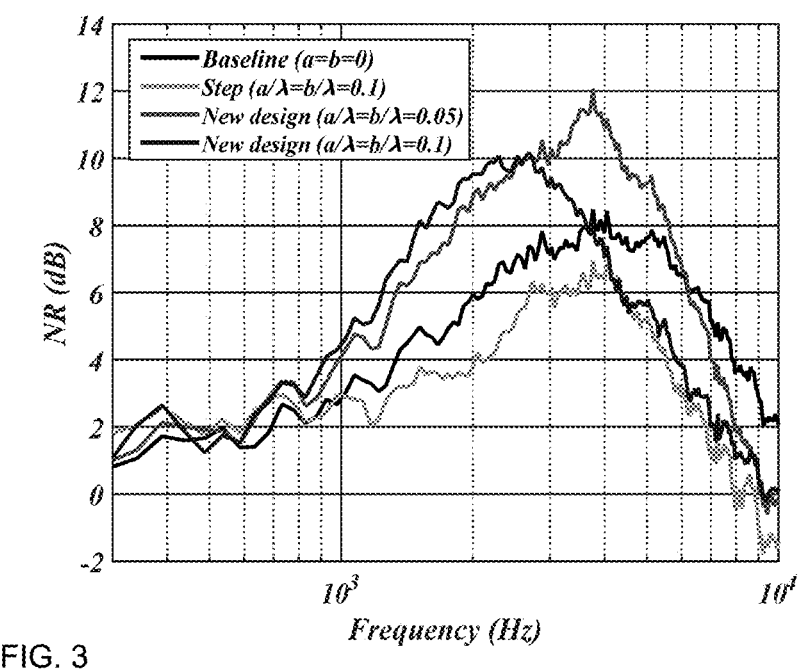
FIG. 3 is a graph showing relative reductions in perceived sound levels of the aerofoil of FIG. 1, in comparison to prior aerofoils, normalised for an aerofoil having a straight leading edge.

FIG. 3 shows results from experimental tests of two different aerofoils in accordance with the present disclosure.

Both tested aerofoils have a waveform height h of 30 mm, and a waveform wavelength λ of 30 mm. A first tested aerofoil has a ratio of spanwise separation to waveform wavelength a:λ of 0.05. Similarly, the first tested aerofoil has a ratio of spanwise extent to waveform wavelength b:λ of 0.05. A second tested aerofoil has a ratio of spanwise separation to waveform wavelength a:λ of 0.1, and a ratio of spanwise extent to waveform wavelength b:λ of 0.1. Flow velocity in these tests was approximately 60 m/s.

FIG. 3 graphs relative reduction in noise in terms of decibels (dB) over a range of frequencies. This is compared to "baseline" and "step" control aerofoils that are not in accordance with the aerofoils of the present disclosure. The baseline aerofoil has a serrated leading edge comprising a triangular waveform having a serration height h of 30 mm and a serration wavelength λ of 30 mm, whereas the step aerofoil has a square wave leading edge having a square wave height h of 30 mm and ratios of spanwise square wave separation to serration wavelength a:λ and spanwise extent to serration wavelength b:λ of 0.05.

As can be seen, both the first and second aerofoils produce significantly less noise for a given serration or square wave height h compared to the control aerofoils, particular at mid-range frequencies which are particularly easily perceived by the human ear. Consequently, further noise reductions over the prior art can be achieved, or reduced slit heights, which may reduce aerodynamic losses. Furthermore, it can be seen that the ratio of each of spanwise square wave separation to serration wavelength a:λ and spanwise extent to serration wavelength b:λ has a large effect on noise reduction.

The mechanism by which the disclosed leading edge profile reduces noise is understood to be a result of the distribution of strong noise producing regions. In particular, the corners 32 of the troughs 26 provide spatially compact noise sources. In view of their chordal spacing, these act as coherent noise sources, which serve to destructively interfere with one another. This effect is particularly pronounced where the coherent noise sources are located more closely together than the waveform wavelength (i.e. a+b<λ).

Further noise attenuation will be provided between the troughs and the peaks. Where the distance a is significantly less than the distance b, the noise sources at the troughs dominate. However, where a is approximately equal to b, the peaks provide significant noise sources, and so also cause destructive interference with the noise sources from the troughs.

Additionally, it has been found by the inventors that, with previous designs, it is often necessary to have relatively large amplitude serrations in order to provide the desired noise reduction. Such large serrations may result in decreased aerodynamic performance (i.e. increased drag). The design described in the present disclosure enables relatively small amplitude serrations for a given noise reduction, and so reduced drag relative to prior designs.

Furthermore, prior designs tended to reduce noise only at specific frequencies. Since noise generated by wake interaction at the leading edge of aircraft components is often relatively broadband (having a large number of frequency components), these prior design are inadequate for effectively reducing perceived noise. In contrast, the design of the present disclosure provides extensive broadband noise reduction over a greater range of frequencies, thereby providing more effective noise reduction.

Figure 4:
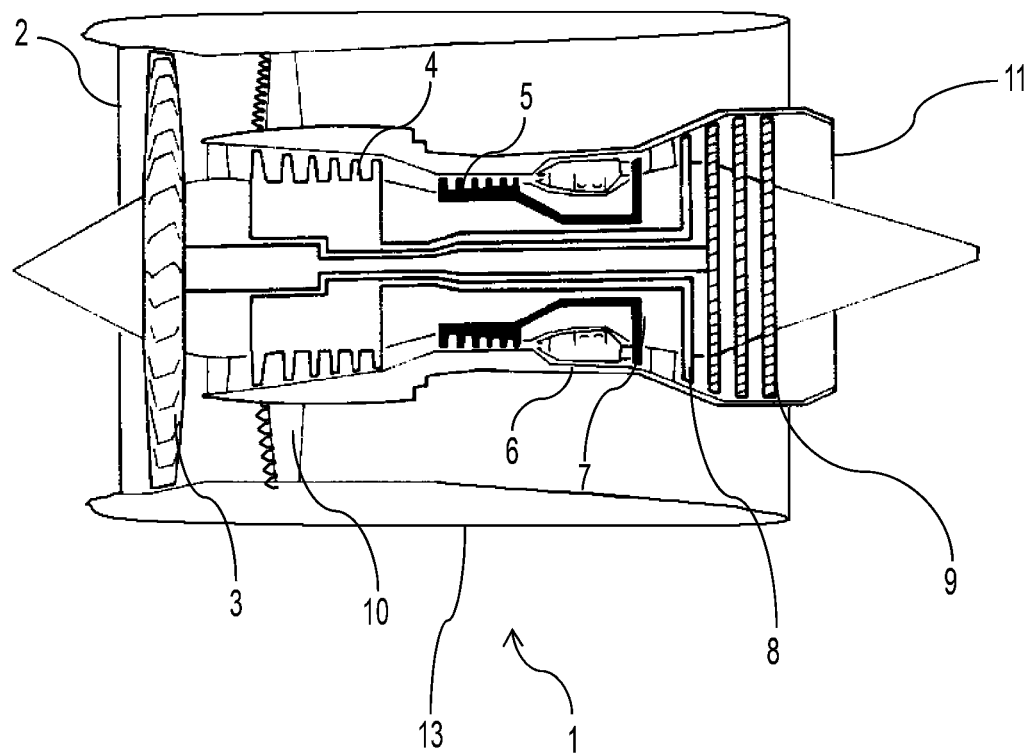
FIG. 4 is a cross sectional schematic of a gas turbine engine comprising an aerofoil in accordance with the present disclosure.

FIG. 4 shows a gas turbine engine 1 employing an aerofoil in accordance with the above disclosure. The engine 1 comprises, in axial flow series, an air intake 2, a propulsive fan 3, an intermediate pressure compressor 4, a high-pressure compressor 5, combustion equipment 6, a high-pressure turbine 7, and intermediate pressure turbine 8, a low-pressure turbine 9 and an exhaust nozzle 11. A nacelle 13 generally surrounds the engine 1 and defines both the intake 2 and the exhaust nozzle 13. Downstream of the fan, an outlet guide vane 10 is provided, which comprises an aerofoil as shown in FIG. 1. Due to the provision of the aerofoil having the leading edge profile in FIG. 1, noise generated by interaction of the fan efflux with the outlet guide vane 10 is reduced relative to prior arrangements.

Figure 5:
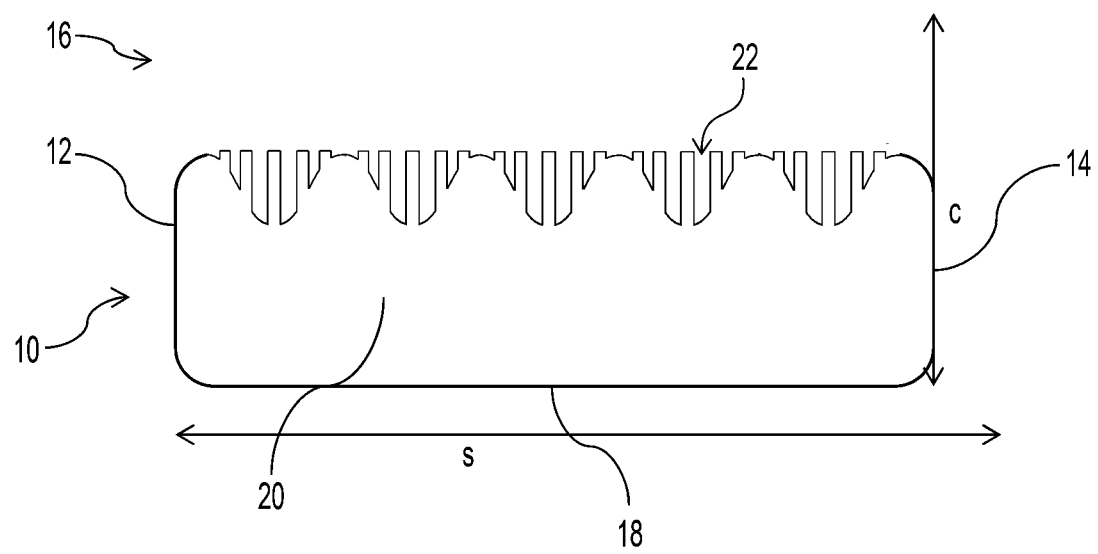
FIG. 5 is a schematic plan view of a second aerofoil in accordance with the present disclosure.

FIG. 5 shows a second embodiment of an aerofoil 110 in accordance with the present disclosure. The aerofoil 110 is similar to the aerofoil 10, except that the triangular waveform of the leading edge is replaced by a sinusoidal waveform, as shown in FIG. 5.

In more detail, the aerofoil comprises leading and trailing edges 16, 18. The leading edge 16 comprises a plurality of spanwise separated slits 122 comprising peaks 128 and troughs 126. Again, the peaks 128 are provided at the same chordal position, while the troughs 126 are provided at varying chordal positions, which is defined by a waveform.

In this case, the waveform is a sinusoidal waveform, i.e. conforms to the equation y=sin x where y is the chordal position relative to the mean chord line $C_0$, and x is the position along the span of the aerofoil 110. Again, the peaks 128 and troughs 126 are interconnected by side surfaces 130, which again extend in a generally spanwise direction. Again, corners 32 having acute angles are defined by each trough 126.

The embodiment of FIG. 5 reduces noise in a similar manner to that described above for the embodiment of FIGS. 1 and 2.

It will be understood that the invention is not limited to the embodiments above-described and various modifications and improvements can be made without departing from the concepts described herein. For example, the invention could be employed in aerofoils of different parts of a gas turbine engine, different parts of an aircraft, or in non-aviation applications, such as wind turbines, marine propellers, industrial cooling fans, and other aerofoils in which noise is a consideration. The invention has been found to be effective for a wide range of aerofoil cross sectional profiles, and also for flat plate aerofoils.

It will be understood that the leading edge profile may not be applied to the whole of the leading edge of the aerofoil. The profile may be applied to swept aerofoils, in which incident flow travels in a direction which is not parallel to the chord.

Except where mutually exclusive, any of the features may be employed separately or in combination with any other features and the disclosure extends to and includes all combinations and sub-combinations of one or more features described herein.

The invention claimed is:
1. An aerofoil comprising
 a trailing edge,
 a leading edge, the leading edge comprising a plurality of peaks and every peak of the leading edge is generally aligned in a straight line in a spanwise direction, and
 a plurality of slits extending toward the trailing edge, each slit defining a slit height from a respective peak of the plurality of peaks at the leading edge to a trough spaced from the leading edge, the troughs defining a repeating waveform pattern, such that the troughs define a plurality of mutually coherent noise sources to cause destructive interference of noise created by the troughs, wherein
 the aerofoil is for a gas turbine engine, and each slit comprises a side surface extending generally chordwise at each end of each peak, interconnecting each peak with an adjacent trough, and extending orthogonally to a generally spanwise extending upstream end surface.

2. The aerofoil according to claim 1, wherein the repeating waveform pattern comprises one of a sawtooth waveform, a triangular waveform, and a sinusoidal waveform.

3. The aerofoil according to claim 1, wherein a spanwise extending interconnecting portion extends at an angle of 30° relative to the chordal direction.

4. The aerofoil according to claim 1, wherein each of the troughs respectively comprises a spanwise extending interconnecting portion extending across the trough interconnecting adjacent side surfaces and defining a spanwise extent.

5. The aerofoil according to claim 4, wherein the spanwise extending upstream end surface has a spanwise extent between 2 and 5 times greater than the spanwise extent of the interconnecting portion.

6. The aerofoil according to claim 5, wherein
a leading edge profile defines a waveform chordal extent between a nadir at a downstream end of the leading edge and the spanwise extending upstream end surface,
a ratio of the chordal extent to a spanwise extent of the interconnecting portion is between 30 and 100, and
a ratio between the chordal extent and the spanwise extent of the spanwise extending upstream end surface is between 10 and 25.

7. The aerofoil according to claim 6 wherein a ratio of a wavelength defined by a spanwise separation between adjacent nadirs to the spanwise extent of the spanwise extending upstream end surface is between 10 and 60.

8. The aerofoil according to claim 1, wherein a leading edge profile comprises a nadir at a downstream end of the leading edge.

9. The aerofoil according to claim 8, wherein the leading edge profile defines a waveform chordal extent between the nadir and the spanwise extending upstream end surface, and wherein a ratio of the chordal extent to a spanwise extent is between 30 and 100, wherein the spanwise extent is across the trough between adjacent side surfaces.

10. The aerofoil according to claim 8,
wherein the leading edge profile defines a waveform chordal extent between the nadir and the spanwise extending upstream end surface, the aerofoil includes a mean chord line defined as a line extending from a root to the tip of the aerofoil along an arithmetic mean of a chordal position of midpoints of chords between the leading edge and the trailing edge of the aerofoil, and includes a mean chord extent defined as a distance between the trailing edge and the mean chord line, and
wherein a ratio between the mean chord extent and the waveform chordal extent is between 20:1 and 10:1.

11. The aerofoil according to claim 1, wherein a leading edge profile comprises a plurality of nadirs each at a downstream end of the leading edge, and a waveform wavelength is defined by a spanwise separation between adjacent ones of the plurality of nadirs, and wherein a ratio of the wavelength to a spanwise extent is between 10 and 60, wherein the spanwise extent is across the trough between adjacent side surfaces.

12. A gas turbine engine comprising the aerofoil in accordance with claim 1.

13. The gas turbine engine according to claim 12, wherein the aerofoil comprises an outlet guide vane.

14. An aircraft comprising the aerofoil according to claim 1.

* * * * *